US007788918B2

(12) United States Patent
Huber et al.

(10) Patent No.: US 7,788,918 B2
(45) Date of Patent: Sep. 7, 2010

(54) HYDRAULIC CIRCUIT FOR ACTUATION OF A HYDRAULIC WORKING CYLINDER

(75) Inventors: Gerhard Huber, Frankenhofen (DE); Andreas Lechleiter, Hurlach (DE); Klaus Schweiger, Steingaden (DE)

(73) Assignee: Hoerbiger Automatisierungstechnik Holding GmbH, Altenstadt (DE)

( * ) Notice: Subject to any disclaimer, the term of this patent is extended or adjusted under 35 U.S.C. 154(b) by 664 days.

(21) Appl. No.: 11/798,923

(22) Filed: May 17, 2007

(65) Prior Publication Data

US 2007/0295416 A1 Dec. 27, 2007

(30) Foreign Application Priority Data

May 18, 2006 (AT) .............................. A 864/2006

(51) Int. Cl.
*F16D 31/02* (2006.01)

(52) U.S. Cl. .......................................... 60/475; 60/476

(58) Field of Classification Search ............ 60/473–476
See application file for complete search history.

(56) References Cited

U.S. PATENT DOCUMENTS 3,678,684 A 7/1972 Sorensen
3,877,347 A * 4/1975 Sheesley et al. ............... 60/476
6,422,127 B1 7/2002 Huber et al.

* cited by examiner

*Primary Examiner*—F. Daniel Lopez
(74) *Attorney, Agent, or Firm*—Dykema Gossett PLLC

(57) ABSTRACT

A hydraulic circuit for actuation of a hydraulic working cylinder (1) having a one-sided piston rod (1*a*), comprising a reversible pump (4) whereby both sides of said pump are connected via a supply line (5) and a first two-way valve (6) to the tank (7) containing hydraulic medium and through releasable control check valves (8) to the working cylinder (1). Both sides of the arrangement are further connected respectively to a hydraulic closeable valve (21, 31) through a discharge line (20, 30) and also to the tank (7) through a replenishing suction line (22, 32) having a corresponding suction valve (9). Each of said hydraulic closeable valves (21, 31) is controlled by the pump (4) through a second two-way valve (4).

The discharge line (20 or 30) of one side of the working cylinder (1) is connected to the respective discharge line (30 or 20) and/or replenishing suction line (32 or 22) at the opposite side of the working cylinder (1), whereby the connected lines are connected to the tank (7) through an arrangement (13) comprising a check valve (14) blocking in the direction of the tank (7) and well as a pressurizing valve (15) opening in the direction of the tank (7) to ensure through simple means the complete filling of the system with hydraulic medium even during manual operation.

8 Claims, 1 Drawing Sheet

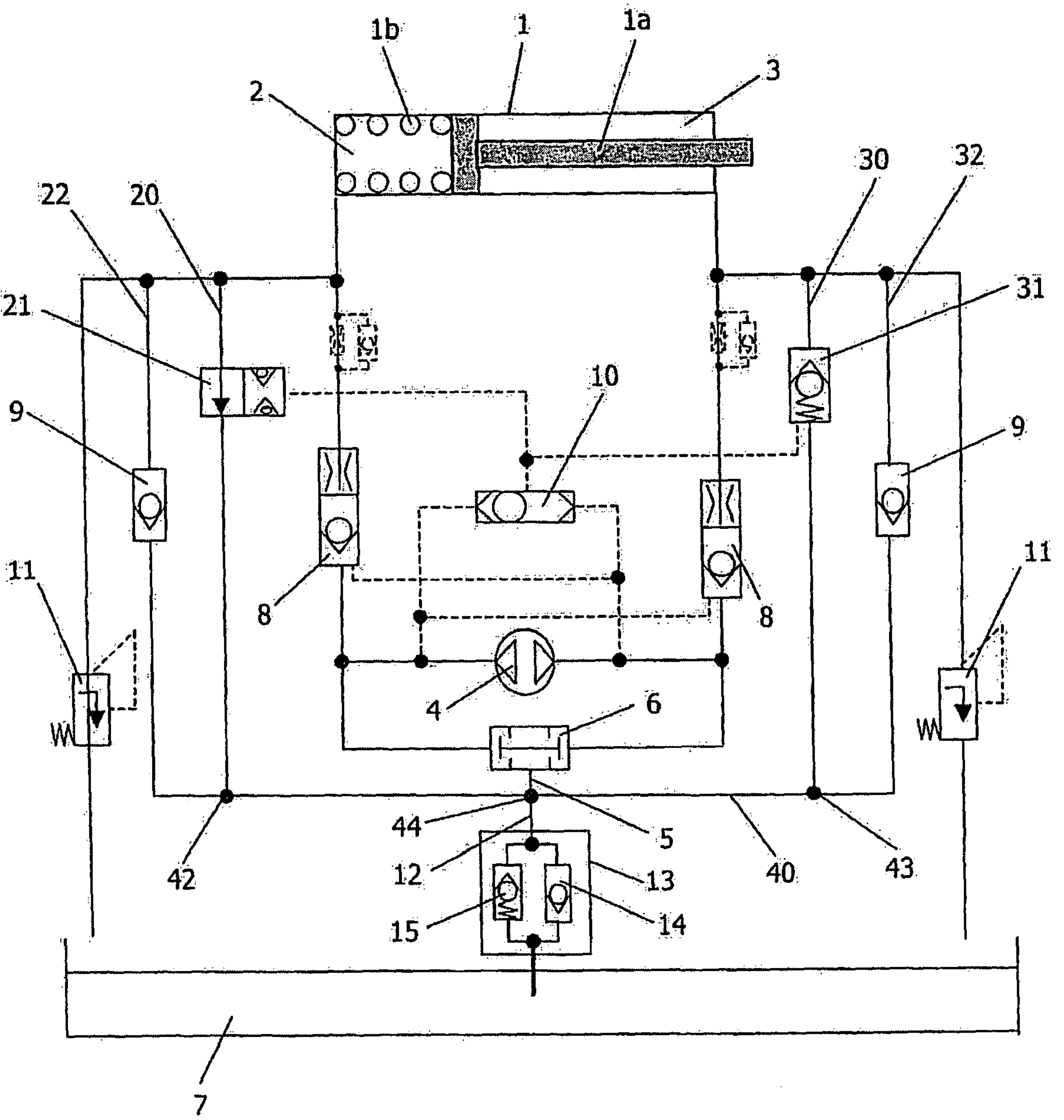
1b
1
1a
2
3
30
32
22
20
31
21
10
9
9
11
11
8
8
4
6
44
5
12
13
40
43
42
15
14
7

HYDRAULIC CIRCUIT FOR ACTUATION OF A HYDRAULIC WORKING CYLINDER

The invention relates to a hydraulic circuit for actuation of a hydraulic working cylinder having a one-sided piston rod, comprising a reversible pump whereby both sides of said pump are connected via a supply line and a first two-way valve to the tank containing hydraulic medium and through releasable control check valves to the working chambers of the working cylinder, whereby both sides of the arrangement are further connected respectively to a hydraulic closeable valve through a discharge line and also to the tank through a replenishing suction line having a corresponding suction valve, whereby each of said hydraulic closeable valves is controlled by the pump through a second two-way valve, and whereby pressure control valves are provided, if necessary, at both sides of the arrangement discharging hydraulic medium into the tank.

Arrangements of this type are provided, for example, for automatic opening and/or closing of trunk covers, trunk lids etc. on vehicles. The piston rod of the working cylinder can be retracted or extended by means of the selector switch of the reversible pump whereby a vehicle part is moved which is connected directly or via a hinge to said piston rod. Aside of this automatic function, there is also required the possibility to manually actuate the trunk cover, the trunk lid, or the like, to ensure emergency actuation in case of failure of the hydraulic system. The complete volume at the piston-side of the working cylinder cannot be filled with hydraulic fluid especially during rapid manual actuation and/or in case of long hose connections in the hydraulic system and/or in case of large cylinder diameters. Air enters thereby into the system, which has a negative effect after automatic operation as been reestablished, particularly through its varying volume, which leads thereby to irregular movements of the actuated vehicle component, and through its increased noise during operation. AT 408 792 B discloses a hydraulic actuation arrangement as described heretofore; however, without the second two-way valve and the second replenishing suction line. CH 524 772 A discloses an arrangement of hydraulic cylinders which are connected to the tank through non-closeable check valves with a safety recirculating line and additionally through other check valves.

It was therefore the object of the present invention to improve the hydraulic circuit of the aforementioned type in such a manner that its disadvantages are avoided and whereby complete filling of the system with hydraulic medium is ensured.

For achievement of this object it is proposed according to the invention, that the discharge line of one side of the working cylinder is connected to the respective discharge line and/or replenishing suction line at the opposite side of the working cylinder and whereby the connected lines are connected to the tank through an arrangement comprising a check valve blocking in the direction of the tank and well as a pressurizing valve opening in the direction of the tank. The amount of hydraulic fluid disposed in the working cylinder can be transferred in a simple and direct manner between the two sides of the working cylinder through the connected discharge lines or through the connection of the discharge line and the opposed replenishing suction line. Any excessive amount of hydraulic fluid is moved into the tank through the pressurizing valve whereby said pressurizing valve ensures that at first as much volume of hydraulic fluid as possible is pushed from the piston-side of the working cylinder to the rod-side of the working cylinder before the discharge into the tank is initiated. During manual extension of the cylinder, the entire amount of hydraulic medium located at the side of the piston rod is also moved over at first and only the amount of hydraulic medium needed to completely fill the piston side must be suctioned from the tank through the check valve.

An advantageous embodiment of the invention is additionally characterized in that at both sides of the working cylinder, the discharge line and the replenishing suction line are connected to one another as well as to the discharge line and to the replenishing suction line of the opposed side of the working cylinder. The transfer of the hydraulic medium between the two sides of the working cylinder is made easier thereby and entering of air into the system is thereby certainly avoided.

The supply of hydraulic medium for automatic operation and for emergency operation can be optimally adjusted independent to one another, if it is advantageously proposed that the connecting lines are connected to the tank via said arrangement and the first two-way valve is also connected independently to the tank.

One embodiment for a simplified circuit is advantageous whereby the first two-way valve cooperates with the connected lines and whereby the entire arrangement is connected to the tank.

Additional simplification is possible relative to the design of the path of lines and the circuit, if according to an additional characteristic of the invention, the connected lines, the line to the first two-way valve, and the line to the tank meet at a common intersection together with the arrangement.

It is advantageously proposed that the check valve and the pressurizing valve are provided in a common housing under consideration of minimizing the amount of components and the path of lines whereby additional simplification of the circuit is provided.

According to an advantageous embodiment of the invention, the hydraulic closeable valve in the rod-side area of the arrangement is formed by a hydraulic closeable check valve.

The hydraulic closeable valve in the piston-side area of the arrangement can also be formed by a shut-off valve which can be actuated hydraulically.

The invention is described in more detail in the following description with the aid of the accompanying illustration of a circuit diagram of one embodiment of the circuit according to the invention.

A hydraulic cylinder 1 with a one-sided piston rod 1*a* is supplied with a hydraulic medium by a hydraulic system and it can be provided for the automatic actuation of trunk covers, trunk lids, etc. on vehicles. A spring element 1*b* can assist the extending movement of the cylinder 1. The piston-side working chamber 2 and the rod-side working 3 are alternately biased with a hydraulic medium through a reversible pump 4, whereby both sides of the pump 4 are connected to a tank 7 containing the hydraulic medium through a supply line 5 and a first two-way valve 6. The supply of hydraulic medium for the working cylinder 1 is performed in a known manner through an arrangement of releasable control check valves 8, whereby both sides of the arrangement are further connected to the tank 7 through a respective discharge line 20, 30 having each a hydraulically closeable valve 21, 31 as well as a respective replenishing suction line 22, 32 having each a suction valve 9. Each of the hydraulically closeable valves 21, 31 are controlled by a second two-way valve 10 from the opposite side of the pump 4, respectively. The hydraulically closeable valve 31 of the rod-side area of the arrangement can typically be formed by a hydraulically closeable check valve, while the hydraulically closeable valve 21 of the piston-side area of the arrangement can be formed by a shut-off valve that can be actuated hydraulically. Pressure control valves 11 are additionally provided diverting hydraulic medium into the tank 7.

According to the invention, the discharge lines 20, 30 are connected to one another by a line section 40 at the side of the working cylinder 1 opposite of the hydraulically closeable valves 21, 31 in place of the current solution for the discharge from said discharge lines 20, 30 into the tank 7. A connection could alternatively or additionally be provided from one of the discharge lines 20 or 30 of the piston-side working chamber 2 or of the rod-side working chamber 3 to the replenishing suction line 32 or 22 supplying the respective opposite working chamber 3 or 2. Hydraulic medium is pushed across into the opposed working chamber 3 or 2 from the working chambers 2 or 3 respectively through the lines 20 or 30 via the valves 21, 31 and furthermore through line 40 during failure of the pump 4 or in case of a pump that is not operating for some other reasons, whereby the valves 21, 31 are opened based on the lack of pressure.

The connected lines to the tank 4 are connected preferably in the section of the connecting line 40 through a combined supply and discharge line 12 and through an arrangement 13 comprising of a check valve 14 blocking in the direction of the tank 7 as well as through a pressurizing valve 15 opening in the direction of the tank. The check valve 14 and the pressurizing valve 15 can thereby also be located in a common housing. Excessive hydraulic medium can thereby be discharged into the tank 7 through the pressurizing valve 15 during transfer of the hydraulic medium from the piston-side working chamber 2 into the rod-side working chamber 3, whereby said pressurizing valve 15 ensures that hydraulic medium completely fills at first the rod-side working chamber 3 before any discharge into the tank 7 is initiated. However, through pressurizing the pressurizing valve 15 it is also ensured during manual extension of the cylinder 1 that at first all of the hydraulic medium located in the rod-side working chamber 3 is pushed across into the piston-side working chamber 2. The hydraulic medium necessary to completely fill the piston-side working chamber 2 is finally suctioned from the tank 7 through the check valve 14 of the arrangement.

The advantageous embodiment of the invention illustrated in the drawing proposes that the discharge line 20 or 30 and the replenishing suction line 22 or 32 is connected to one another at both sides of the working cylinder 1 (at 42 or 43)—and it is connected through the connection line 40 with the discharge line 30 or 20 and the replenishing line 32 or 22 at the opposed side of the working cylinder 1. The transfer of hydraulic medium between the two sides of the working cylinder 1 is made possible even with less resistance based on the added diameters.

While the connection lines 40 or the connected lines 20, 22, 30, 32 can be connected to the tank 7 independently from one another through the arrangement 13 and through the first two-way valve 6, there is a simpler design of the system possible if the line to the first two-way valve 6 is also connected through the arrangement 13 with the tank 7. The lines 5, 12 and 40 form thereby a common intersection 44.

The invention claimed is:

1. A hydraulic circuit for actuation of a hydraulic working cylinder having a one-sided piston rod, comprising a reversible pump having two sides, whereby each side of said pump is selectively connected by a first two-way valve and a supply line to a tank containing hydraulic medium;

whereby each side of said pump is connected through respective releasable control check valves to respective working chambers of the working cylinder;

whereby each working chamber is connected to a respective discharge line having a respective hydraulic closeable valve, and to a respective replenishing suction line having a respective suction valve;

wherein opposite ends of the discharge lines and/or replenishing suction line, opposite the respective ends connected to the respective working chambers, are connected together, and connected to the tank through an arrangement; wherein the arrangement includes a check valve blocking in the direction of the tank and well as a pressurizing valve opening in the direction of the tank; and whereby each of said hydraulic closeable valves is controlled by the pump through a second two-way valve.

2. The hydraulic circuit according to claim 1, wherein the opposite ends of both discharge lines and the opposite ends of both replenishing suction lines are connected to one another.

3. The hydraulic circuit according to claim 1, wherein each working chamber is connected to a respective pressure control valve, which discharges hydraulic medium into the tank.

4. The hydraulic circuit according to claim 1, wherein the first two-way valve is connected to the opposite ends of the discharge lines and/or the opposite ends of both replenishing suction lines.

5. The hydraulic circuit according to claim 4, wherein the opposite ends of the discharge lines and/or the opposite ends of both replenishing suction lines, the supply line to the first two-way valve, and the line to the arrangement meet at a common intersection.

6. The hydraulic circuit according to claim 1, wherein the check valve and the pressurizing valve are provided in a common housing.

7. The hydraulic circuit according to claim 1, wherein the hydraulic closeable valve connected to the working chamber on a rod-side is formed by a hydraulic closeable check valve.

8. The hydraulic circuit according to claim 1, wherein the hydraulic closeable valve connected to the working chamber on a piston-side is formed by a shut-off valve which is actuated hydraulically.

* * * * *